April 15, 1969  F. H. FANNING, JR., ET AL  3,438,616
KILN WITH CONVEYOR MECHANISM
Filed June 12, 1967

INVENTORS
FRED H. FANNING, JR.
EDWIN RUH
BY
*William C. Nealon*
ATTORNEY

United States Patent Office 3,438,616
Patented Apr. 15, 1969

3,438,616
KILN WITH CONVEYOR MECHANISM
Fred H. Fanning, Jr., Ingomar, and Edwin Ruh, Pittsburgh, Pa., assignors to Dresser Industries, Inc., Dallas, Tex., a corporation of Delaware
Filed June 12, 1967, Ser. No. 645,355
Int. Cl. F27b 9/16
U.S. Cl. 263—6                                         7 Claims

ABSTRACT OF THE DISCLOSURE

The present invention is directed to a static kiln for burning, in a continuous manner, refractory articles. The kiln consists of a flat hearth which may be disposed horizontally or at an acute angle from the horizontal. The hearth is lined with rotatable ceramic ware so that the refractory articles may pass across the ware from the feed end to the discharge end of the kiln by rotation of the ware with a minimum of friction. Additionally, the invention is directed to methods for burning refractory articles utilizing the above apparatus.

---

It has been the desideratum of the refractories industry to provide a roller hearth kiln which eliminates the need for car tops, car maintenance or kiln furniture. Heretofore, the rollers used in at least a portion of roller hearth kilns were composed of ceramic rods or tubular like members which extended across the hearth and were journaled at the ends. The width of the kiln employing these rods was limited by design and manufacturing problems associated therewith.

Accordingly, it is an object of the present invention to provide a kiln with a hearth having a rotatable ceramic bed without limiting the width of the hearth.

Another object of the invention is to provide a novel means for firing refractory articles.

A further object is to provide improved methods for burning refractory articles on roller hearth type kilns.

Figure 1:
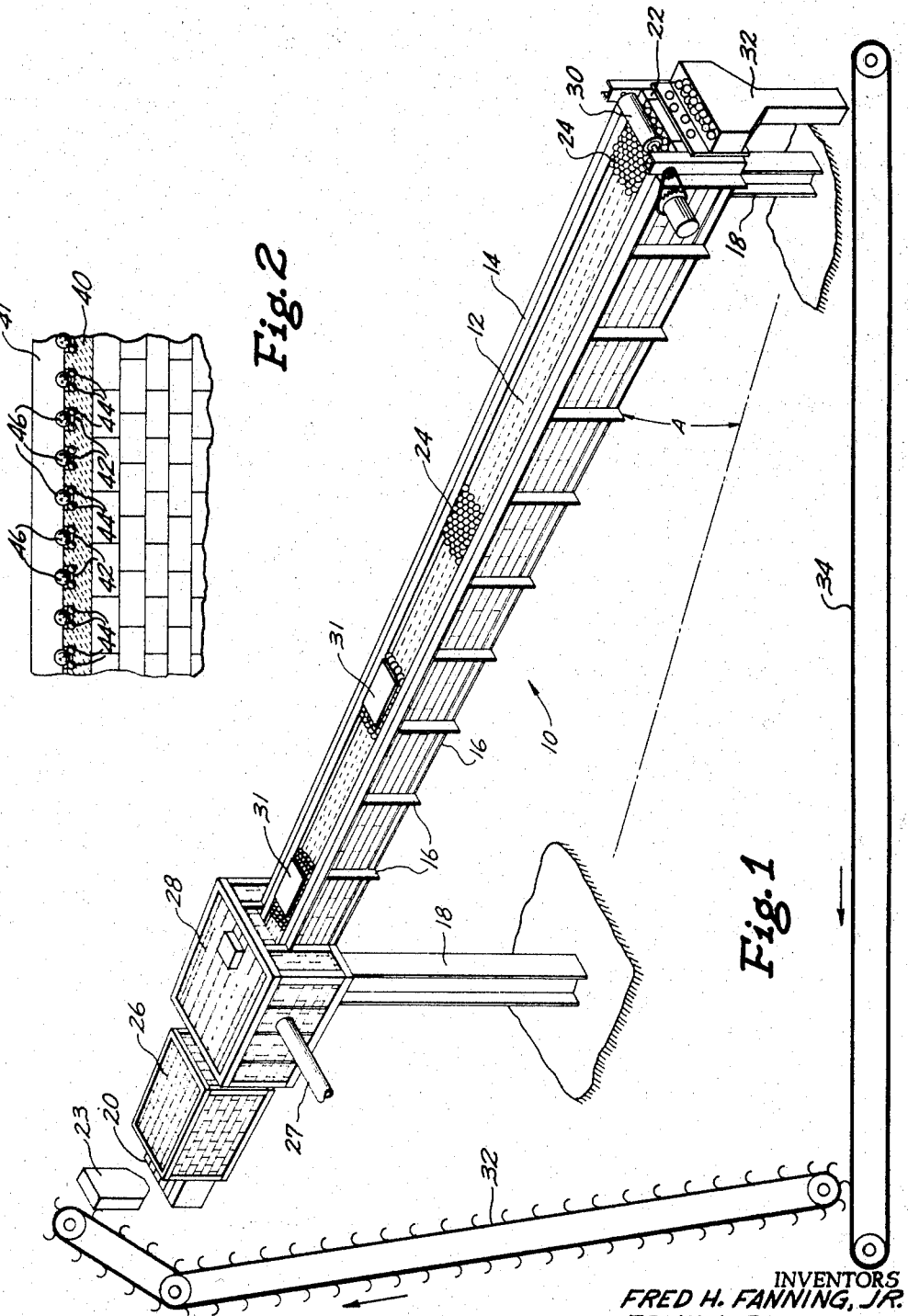
Figure 2:
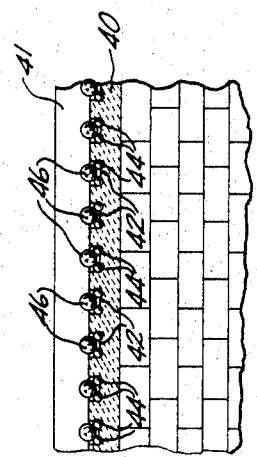

In order to understand more fully the nature and objects of the present invention, reference should be had to the following details and descriptions of drawings in which:

FIG. 1 is an isometric view of a static kiln useful in practicing the present invention; and FIG. 2 is an elevation view, partly in section, of a portion of a modified kiln hearth for use in the present invention.

Broadly, there is provided a method for continuously burning refractory articles. An elongated, relatively flat hearth is constructed having upwardly extending sidewalls. The hearth contains a feed end and a discharge end. The hearth may be disposed horizontally so that the feed and discharge end are at the same elevation or it may be inclined at an acute angle from the horizontal so that the feed end is at a greater elevation than the discharge end. A means is provided, adjacent the feed end, for burning the refractory articles. It is generally a box-like housing that completely envelops a portion of the hearth. The hearth is lined with a layer of substantially uniformly sized rotatable ceramic ware between the feed end and discharge end. The articles to be burned are disposed on the ware at the feed end and are passed thereacross through the burning means to the discharge end. The movement of the articles is facilitated by rotation of the ware. The burned refractory ware are then removed at the discharge end of the hearth.

In one aspect of the invention, the kiln is disposed so that the hearth is horizontally aligned. The hearth is lined with substantially uniformly sized rotatable ceramic ware between the feed end and discharge end. The articles to be burned are disposed on the ware at the feed end. The articles are forced across the ware physically or automatically by means of a pusher through the burning means to the discharge end. The movement of the articles is facilitated by the rotation of the ware with the ware accompanying the articles to the discharge end. The burned articles are removed while discharging the accompanying ware and additional ceramic ware is fed at the feed end of the hearth to provide a continuous flow thereof.

In another aspect of the invention, the hearth of the kiln is inclined at an acute angle from the horizontal. The hearth is lined with a layer of substantially uniformly sized, closely packed, rotatable ceramic ware from the feed end to the discharge end. The discharge end of the hearth contains a drive means engageable with the ceramic ware to control the rate of descent and discharge thereof. When the drive means is activated it engages the ceramic ware and discharges it at a constant rate while additional ceramic ware is provided at the feed end at an equivalent rate to provide a continuously moving bed of rotating ceramic ware which descends from the feed end to the discharge end by gravity, the drive means permitting an increase or decrease in the rate of descent. The refractory articles to be burned are disposed on the ware at the feed end and are allowed to descend by rotation of the ware through the burning means or chamber to the discharge end where they are removed. The angle of inclination of the hearth would depend upon the type and size of rotatable ceramic ware employed and the type of refractory articles being burned. However, in most instances, the angular inclination of the hearth need not exceed about 22°. Greater inclination may cause a too rapid descent of the ceramic ware or, owing to the close packed relationship in which the rotatable ceramic ware descend, either the bearing pressure of the upper ware on the lower ware becomes sufficient to cause breakage, or the ware may tend to buckle.

In another embodiment of the invention, whether the hearth be horizontally disposed or disposed at an acute angle, the ceramic ware are rotatably disposed on the hearth in situ between the feed end and discharge end. This aspect of the invention is directed primarily to spherical ceramic ware and to short rods (i.e., not exceeding about 2″ in length) that may be employed equivalently. Tubular rods heretofore were, in length, approximately equal to the width of the hearth, and were journaled at the ends of the side walls. Problems have been encountered with breakage and failure of the journaling mechanism. Also, as mentioned previously, these rods limited the width of the hearth. Thus, it is important that the spherical (or equivalent short rods) ceramic ware are not similarly secured. That is, they are not axially secured or rotatable about only one axis in the case of the spheres.

An improved means for rotatably disposing the spheres or rods on the hearth is to provide a plurality of hemispherical or hemicylindrical depressions in the hearth. The depressions may then contain bearings upon which the rotatable ware can freely rotate without friction or the depressions may contain an aperture through which high pressure gas may be jetted to freely suspend the spheres within the confines of the depressions. In both cases, the ware are free to rotate and facilitate movement of the refractory articles passing thereover with a minimum of friction. In this embodiment of the invention, the spherical ceramic ware may be closely packed or spaced as desired by the user.

Referring to FIG. 1, there is shown an inclined static kiln 10 for use in the present invention. The hearth 12 of the kiln is relatively long and narrow and contains a flat bed which is fabricated from refractory brick at least in the burning and preheating zones. The hearth contains slightly upwardly extending side walls 14 to retain the ware and articles being burned. The side walls may also be fabricated from refractory brick. The side walls and hearth are supported by structural steel members 16 which extend from end to end. The entire kiln in turn is supported on structural beams 18 and is inclined at an angle A of approximately 22°, from the horizontal. Preferably, the structural beams are in the form of adjustable jacks to vary the angle of inclination in different instances.

The kiln contains an upper or feed end 20 and a lower or discharge end 22. At the feed end, a hopper or conveyor or other equivalent means 23 is disposed for providing a constant supply of rotatable ceramic ware 24 to the hearth.

Located near the feed end is the preheating zone of the kiln. In this zone, the hearth is completely encapsulated with refractory brick to provide a box-like structure 26 which contains the burners 27 for providing the desired preheating temperature. Separated, but adjacent the preheating zone is a similar box-like structure 28 which is the burning zone. While a single box-like housing unit may serve to provide both zones, two housings are preferred.

Disposed at the lower or discharge end of the kiln is a compressible roller 30 which extends across the side walls. The compressible rollers bear down upon the fired refractory ware to control the rate of descent from the feed end to the discharge end and alternately discharges the ware. The roller can be driven at variable speeds to provide the necessary period of time for burning the ceramic ware in the firing zone. It should be understood that equivalent drive means, such as, a roller with blades thereacross or pockets or a conveyor belt may also be employed so long as the means constantly engages the ware.

In the method of the invention, the compressible roller, which in this case is chain driven, is activated so that it begins to rotate at a speed necessary to provide the adequate residence period for the unburned refractory articles 31, set thereon, in the preheating and firing chambers. As the roller rotates, the ceramic ware are discharged and the ware thereabove progresses downwardly by gravity flow. By gravity flow, it is meant that the ware descends by rotation without substantial sliding or friction. The feed hopper or conveyor provides a continuous supply of rotatable ware in close packed arrangement at the feed end.

In a continuous operation, the ceramic ware may be deposited from the discharge end 30 to a chute 32, then on a conveyor 34 which passes the ware to a vertical conveyor 36 near the the feed end. The vertical conveyor returns the ceramic ware to the feed hopper 23 above the hearth to provide a continuous closely packed arrangement or bed. The speed of the conveyors is timed with the speed or rotation of the drive mechanism so that as one rotatable ceramic ware is released at the discharge end, one will be deposited at the feed end.

While FIG. 1 shows the kiln to be inclined, it should be appreciated that the same arrangement shown, may be employed horizontally with a modification of the conveying system. Of course, with a horizontal disposition of the hearth, the drive mechanism disposed at the discharge end is not necessary.

Referring to FIG. 2, there is shown a portion of a hearth of a kiln according to this invention. The remainder of the kiln, relating to structure is similar to the kiln shown in FIG. 1 with the exception of the drive means. As shown in the drawing, the hearth bounded by side wall 41 contains hemispherical depressions in which are disposed bearings 44. The rotatable ceramic ware 46 (spherical) rests on the bearings and is caused to rotate as the refractory articles pass thereacross. The spheres will rotate without restriction to the axis to prevent subjugation of the same surfaces of the spheres to contact with the refractory articles. This hearth may be disposed either horizontally or inclined from the horizontal, as desired, so that the ware may be pushed across the ware or descend by gravity as in the other embodiments.

Since certain changes in the apparatus described and in carrying out the above process may be made without departing from its scope, it is intended that the accompanying description and drawings be interpreted as illustrative and not limiting.

Having thus described the invention in detail and with sufficient particularity as to enable those skilled in the art to practice it, what is desired to have protected by Letters Patent is set forth in the following claims:

We claim:

1. A method for continuously burning refractory articles comprising providing an elongated, relatively flat hearth having upwardly extending side walls and a feed and discharge end, there being means for burning the articles adjacent the feed end, rotatably disposing a plurality of substantially uniform spheres composed of ceramic material on the hearth in situ between the feed and discharge ends, disposing the articles to be burned on the ware at the feed end, passing the articles across the ware through the burning means to the discharge end, said movement being facilitated by rotation of the ware and removing the burned articles.

2. The method of claim 1 in which the kiln hearth is horizontally disposed.

3. The method of claim 1 in which the hearth is inclined at an acute angle from the horizontal so that the feed end is above the discharge end.

4. A static kiln for continuously burning refractory articles comprising an elongated, relatively flat hearth having upwardly extending side walls for retaining said ware, and a feed and discharge end, means for burning the articles adjacent the feed end, and a plurality of substantially uniform spheres composed of ceramic material rotatably disposed on the hearth in situ between the feed end and discharge end.

5. A kiln according to claim 4 in which the hearth is inclined at an acute angle from the horizontal so that the feed end is above the discharge end.

6. A method for continuously burning refractory articles comprising providing an elongated, relatively flat hearth having upwardly extending side walls and a feed and discharge end, there being means for burning the articles adjacent the feed end and means for feeding and discharging the ware, lining the hearth with a layer of substantially uniformly sized rotatable ceramic ware between the feed end and discharge end, disposing the articles to be burned on the ware at the feed end, forcing the articles across the ware through the burning means to the discharge end, said movement being facilitated by rotation of the ware with minimum friction, said ware accompanying the refractory articles to the discharge end removing the burned articles while discharging the accompanying ware and supplying additional ceramic ware at the feed end to provide a continuous flow thereof.

7. A method for continuously burning refractory articles comprising providing an elongated, relatively flat hearth having upwardly extending side walls, disposing the hearth at an acute angle to the horizontal to provide a feed end elevated with respect to a discharge end, lining the hearth with a layer of substantially uniformly sized closely packed rotatable ceramic ware from the feed end to the discharge end, the discharge end having a drive means engageable with the ceramic ware to control the rate of descent and discharge thereof, there being means for burning the articles adjacent the feed end and means for feeding the ware, activating the drive means to engage the ceramic ware and discharge it at a constant rate while simultaneously feeding ceramic ware at the feed end at an equivalent rate to provide a continuously moving bed of rotating ceramic ware which descend by gravity, disposing the refractory articles to be burned on the ware at the feed end, allowing the articles to descend by rotation of the ware with minimum friction through the burning means to the discharge end and removing the articles.

References Cited

UNITED STATES PATENTS 1,778,267   10/1930   McArthur.
2,592,236    4/1952   Bloom _____ 263—6

JOHN J. CAMBY, *Primary Examiner.*